United States Patent
Goto (10) Patent No.: US 6,827,996 B2
(45) Date of Patent: Dec. 7, 2004

(54) THREADED JOINT FOR STEEL PIPES AND PROCESS FOR THE SURFACE TREATMENT THEREOF

(75) Inventor: Kunio Goto, Kobe (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 10/361,556

(22) Filed: Feb. 11, 2003

(65) Prior Publication Data

US 2003/0159764 A1 Aug. 28, 2003

Related U.S. Application Data

(63) Continuation of application No. PCT/JP02/03588, filed on Apr. 11, 2002.

(30) Foreign Application Priority Data

Apr. 11, 2001 (JP) ........................................ 2001-112884
May 1, 2001 (JP) ........................................ 2001-134576

(51) Int. Cl.$^7$ ........................... B32B 1/08; B32B 15/04; F16L 9/02; F16L 25/10; F16L 15/00
(52) U.S. Cl. ................... 428/36.9; 428/36.91; 428/457; 428/469; 428/418; 285/94; 285/333; 285/390; 285/334
(58) Field of Search ..................... 285/94, 333, 390, 285/334; 428/36.9, 36.91, 457, 469, 418

(56) References Cited

U.S. PATENT DOCUMENTS

| | | | | |
|---|---|---|---|---|
| 2,736,700 A | * | 2/1956 | Graham et al. | ............ 508/168 |
| 4,256,811 A | * | 3/1981 | Black | ........................ 428/562 |
| 4,692,988 A | * | 9/1987 | Shulver et al. | ............... 29/458 |
| 6,017,857 A | * | 1/2000 | Heimann et al. | ........... 508/136 |
| 6,027,145 A | * | 2/2000 | Tsuru et al. | .................. 285/94 |

FOREIGN PATENT DOCUMENTS

| | | |
|---|---|---|
| JP | 06-023459 | 2/1994 |
| JP | 07-217777 | 8/1995 |
| JP | 08-103724 | 4/1996 |
| JP | 08-233163 | 9/1996 |
| JP | 08-233164 | 9/1996 |
| JP | 09-072467 | 3/1997 |
| JP | 2001-099364 | 4/2001 |
| WO | WO 96/10710 | 4/1996 |

OTHER PUBLICATIONS

Machine translation of JP 09–072467.*

* cited by examiner

Primary Examiner—Sandra M. Nolan
Assistant Examiner—Chris Bruenjes
(74) Attorney, Agent, or Firm—Clark & Brody (57) ABSTRACT

This invention relates to a threaded joint for steel pipes which comprises a pin and a box each having a contact surface including a threaded portion and an unthreaded metal contact portion and which can be prevented from galling during repeated fastening and loosening without application of a compound grease. A solid lubricant coating which comprises a lubricating powder such as molybdenum disulfide and a resin binder is formed on the contact surface of at least one of the pin and the box. The solid lubricant coating has a hardness of 70–140 on the Rockwell M scale and an adhesive strength of at least 500 N/m as determined by the SAICAS (Surface And Interfacial Cutting Analysis System) method, and it exhibits excellent galling resistance even in the environment of high-temperature oil wells. Inclusion of ultraviolet screening fine particles such as titanium oxide fine particles in the solid lubricant coating increases the rust preventing properties of the threaded joint.

7 Claims, 2 Drawing Sheets

THREADED JOINT FOR STEEL PIPES AND PROCESS FOR THE SURFACE TREATMENT THEREOF

This application is a continuation of International Patent Application No. PCT/JP02/03588, filed Apr 11, 2002. This PCT application was not in English as published under PCT Article 21(2).

TECHNICAL FIELD

This invention generally relates to a threaded joint for steel pipes for use in connecting oil well pipes to each other. More particularly, this invention relates to a threaded joint for steel pipes which has a solid lubricant coating having excellent galling resistance, gas tightness, and rust preventing properties and which does not require the application of a compound grease containing a heavy metal powder, which application was conventionally carried out before each time fastening was performed in order to prevent the joint from galling, and to a process for surface treatment capable of forming such a solid lubricant coating.

BACKGROUND ART

Oil well pipes which are steel pipes used in the drilling of oil wells are connected with each other by a threaded joint for steel pipes. The threaded joint is comprised of a pin having a male thread and a box having a female thread.

Figure 1:
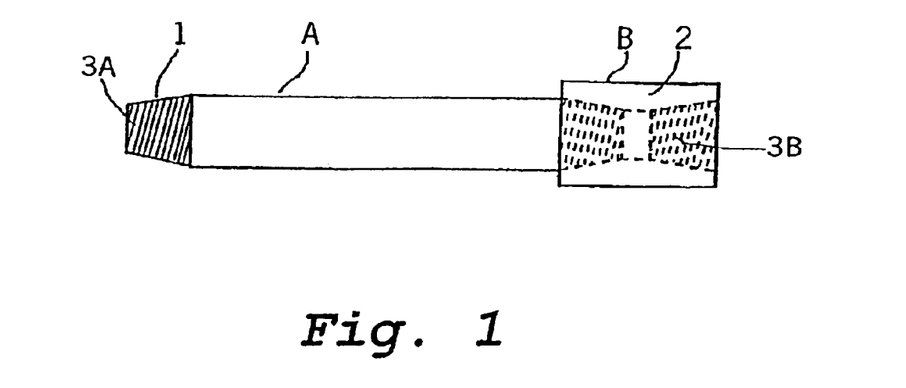
FIG. 1 is a diagram which schematically shows a typical assembly of a steel pipe and a threaded coupling at the time of shipment of the steel pipe.

As schematically shown in FIG. 1, a male thread 3A is normally formed on the outer surface at both ends of a steel pipe A to form a pin 1, and a female thread 3B is formed on both sides of the inner surface of a separate joint member in the form of a sleeve-shaped coupling B to form a box 2. As shown in FIG. 1, the steel pipe A is normally shipped in a state in which a coupling B is previously connected to one end.

A threaded joint for steel pipes is subjected to compound pressures due to axial tensile forces caused by the weight of the steel pipe and the coupling and internal and external pressures underground, and it is also subjected to heat underground. Therefore, a threaded joint is required to maintain gas tightness (sealability) without being damaged even under such conditions. In addition, during the process of lowering oil well pipes, it is often the case that a joint which has once been fastened is loosened (unfastened) and then refastened. Therefore, according to API (American Petroleum Institute), it is desired that there be no occurrence of severe seizing called galling and that gas tightness be maintained even if fastening (make-up) and loosening (break-out) are carried out ten times for joints for tubing and three times for joints for casing.

In recent years, in order to improve gas tightness, special threaded joints which are capable of forming a metal-to-metal seal have come to be generally used. In this type of threaded joint, each of a pin and a box has an unthreaded metal contact portion in addition to a threaded portion having a male or female thread, and both the threaded portion and the unthreaded metal contact portion form a contact surface between the pin and box. The unthreaded metal contact portions of the pin and the box come into intimate contact with each other to form a metal-to-metal seal portion and contribute to an increase in gas tightness.

In such a threaded joint capable of forming a metal-to-metal seal, a lubricating grease with high lubricity called a compound grease has been used. This grease, which is a kind of liquid lubricant, is applied to the contact surface of at least one of the pin and the box prior to fastening. However, this grease contains a large amount of harmful heavy metal powders. When the grease which is squeezed out to the periphery during fastening is cleaned with a cleaning agent, the compound grease and the used cleaning agent flow out into the ocean or the soil and cause environmental pollution, and this has come to be considered a problem. In addition, there was the problem that the application of grease and cleaning which were repeated before each fastening lowered the working efficiency in the field.

As threaded joints for steel pipes which do not need the application of a compound grease, JP 08-103724A, JP 08-233163A, JP 08-233164A, and JP 09-72467A disclose threaded joints in which a solid lubricant coating comprising a resin as a binder and molybdenum disulfide or tungsten disulfide as a solid lubricant is applied to a threaded portion and an unthreaded metal contact portion (namely, to the contact surface) of at least one of a pin and a box.

In these Japanese patent publications, in order to increase the adhesion between the solid lubricant coating and the substrate steel, it is disclosed to form, as an undercoating layer for the solid lubricant coating, a manganese phosphate chemical conversion coating layer or a combination of a nitride layer and a manganese phosphate chemical conversion coating layer, or to provide the contact surface with surface roughness having an Rmax of 5–40 μm. JP 08-103724A discloses that a solid lubricant coating is formed by performing baking of an applied coating with heating for 20–30 minutes in the temperature range of 150–300° C.

It might be expected that the use of a threaded joint in which the contact surface of a pin and a box has a solid lubricant coating formed by surface treatment to provide lubricity thereto would make it possible to dispense with the application of a compound grease and thus avoid the aforementioned problems regarding the environment and working efficiency.

However, with a conventional solid lubricant coating, it is not possible to attain a high anti-galling effect such as can be obtained by application of a compound grease, and a seizing flaw called galling occurs after fastening and loosening are repeated several times. Thus, the effect of a conventional solid lubricant coating for preventing galling was insufficient.

The decrease in galling resistance and gas tightness of a threaded joint was significant, particularly when the storage period of the threaded joint from its shipping out of the factory (i.e., from the formation of a solid lubricant coating) to its actual use on a rig site to fasten it was long (it is sometimes as long as one or two years).

Furthermore, recently, a heat-resistant threaded joint for steel pipes has been desired for use in high-temperature oil wells in which the temperature reaches 250–300° C., which is higher than the temperature in conventional oil wells, or in steam-injection oil wells into which steam at a high temperature close to the critical temperature (e.g., around 350° C.) is injected in order to improve oil recovery. Therefore, it has been required for a threaded joint to guarantee galling resistance and gas tightness when a joint which has been fastened is subjected to a heating test at a temperature of around 350° C. and then subjected to loosening and re-fastening. With the above-described conventional solid lubricant coating, it was difficult to assure these properties required for a heat-resistant threaded joint.

It is an object of this invention to provide a process for the heat treatment of a threaded joint for steel pipes, which can form a solid lubricant coating having excellent galling resistance which can effectively suppress the occurrence of galling upon repeated fastening and loosening even with a heat-resistant threaded joint for steel pipes.

It is another object of this invention to provide a threaded joint for steel pipes which can alleviate a decrease in galling resistance and gas tightness without using a compound grease when it is stored for a prolonged period from the formation of a solid lubricant coating to its use on site.

DISCLOSURE OF THE INVENTION

According to one aspect, the present invention is a process for the surface treatment of a threaded joint for steel pipes comprising a pin and a box each having a contact surface including a threaded portion and an unthreaded metal contact portion, characterized in that the process comprises the steps:

applying a coating fluid containing a resin binder and a lubricating powder in a solvent to the contact surface of at least one of the pin and the box, and drying the applied coating by multistage heating which includes at least first stage heating in the temperature range of from 70° C. to 150° C. and second stage heating in the range of from higher than 150° C. to 380° C. to form a solid lubricant coating on the contact surface.

The process may further include, prior to the coating application step, a step of heating the contact surface to be coated to a temperature of from 50° C. to 200° C.

The solid lubricant coating formed according to the process of the present invention can possess a hardness of 70–140 on the Rockwell M scale and an adhesive strength of at least 500 N/m as determined by the SAICAS (Surface And Interfacial Cutting Analysis System) method.

It has been found that a cause of insufficient galling resistance of a conventional solid lubricant coating formed on the contact surface of a threaded joint for steel pipes is insufficient hardness of the coating, which is caused by insufficient drying of the coating.

A solid lubricant coating for a threaded joint is generally formed by applying a coating fluid containing a resin and a lubricating powder (e.g., molybdenum disulfide powder) in a volatile solvent to the contact surface of the threaded joint, followed by heating to dry (or bake) the applied coating. In the case where the applied coating is dried by heating at a temperature of 150–300° C. as employed in the prior art, even if the heating is carried out for a prolonged period, it is not possible to completely evaporate the solvent, and a minute amount of the solvent and moisture is confined in the dried coating and leads to the formation of internal defects, which prevent the coating from having sufficient hardness and galling resistance. Such a solid lubricant coating wears off when fastening and loosening are repeated, and it ends up completely wearing out, thereby producing metal-to-metal contact and causing galling.

In accordance with the above-described process of the present invention, drying becomes complete by performing the drying by at least two stages comprising a first stage heating at a lower temperature and a second stage heating at a higher temperature, resulting in the formation of a solid lubricant coating which has higher hardness than that obtained in the case where drying is performed by heating at a fixed temperature as employed in the prior art and which is improved with respect to galling resistance, wear resistance, adhesion, and rust preventing properties and adapted even to the environment of high-temperature oil wells.

The present invention also relates to a threaded joint for steel pipes comprising a pin and a box each having a contact surface including a threaded portion and an unthreaded metal contact portion, characterized in that the contact surface of at least one of the pin and the box has a solid lubricant coating formed thereon which comprises a lubricating powder selected from molybdenum disulfide and/or tungsten disulfide and a resin, the coating having a hardness of 70–140 on the Rockwell M scale and/or an adhesive strength of at least 500 N/m as determined by the SAICAS method.

According to another aspect, the present invention is a threaded joint for steel pipes comprising a pin and a box each having a contact surface including a threaded portion and an unthreaded metal contact portion, characterized in that the contact surface of at least one of the pin and the box has a solid lubricant coating formed thereon which comprises a lubricating powder, ultraviolet screening fine particles, and a resin binder.

A cause for a decrease in galling resistance and gas tightness encountered in a conventional threaded joint having a solid lubricant coating comprising a resin and a lubricating powder on the contact surface thereof when the joint is stored for a long period is that the rust preventing properties of the solid lubricant coating are markedly inferior to those of a compound grease so that it is not capable of completely protecting the contact surface of the threaded joint from rusting during storage. If rust is caused on the contact surface of the pin or the box during storage of such a threaded joint, the adhesion of the solid lubricant coating of the joint decreases markedly, and blistering and peeling of the coating occur. In addition, the contact surface roughness increases due to the rust. As a result, when steel pipes are connected by fastening a threaded joint, fastening becomes unstable, leading to the occurrence of galling during fastening or loosening and a decrease in gas tightness.

It was found that rusting during storage of a threaded joint having a solid lubricant coating is mainly caused by aging or deterioration with time of the resin used as a binder in the solid lubricant coating, particularly by forming cracks in the coating due to deterioration of the resin by ultraviolet light and allowing moisture to penetrate through the cracks. In order to prevent a solid lubricant coating from deteriorating by ultraviolet light, it has been found that addition of inorganic ultraviolet screening fine particles, not an organic ultraviolet absorbing agent, is effective and that rusting of a threaded joint during long-term storage is significantly suppressed by a solid lubricant coating containing ultraviolet screening fine particles.

Preferably, the ultraviolet screening fine particles are fine particles of one or more substances selected from titanium oxide, zinc oxide, and iron oxide, and they have a mean particle diameter of 0.01–0.1 $\mu$m and are present in the solid lubricant coating with a mass ratio of 0.1–50 parts to 100 parts of the resin binder.

In the present invention, a lubricating powder is preferably a powder of one or more substances selected from molybdenum disulfide, tungsten disulfide, graphite, boron nitride, and polytetrafluoroethylene.

It is also preferred that the contact surface on which a solid lubricant coating is formed have a porous coating layer as a primary coat underlying the solid lubricant coating.

DETAILED DESCRIPTION OF THE INVENTION

Figure 2:
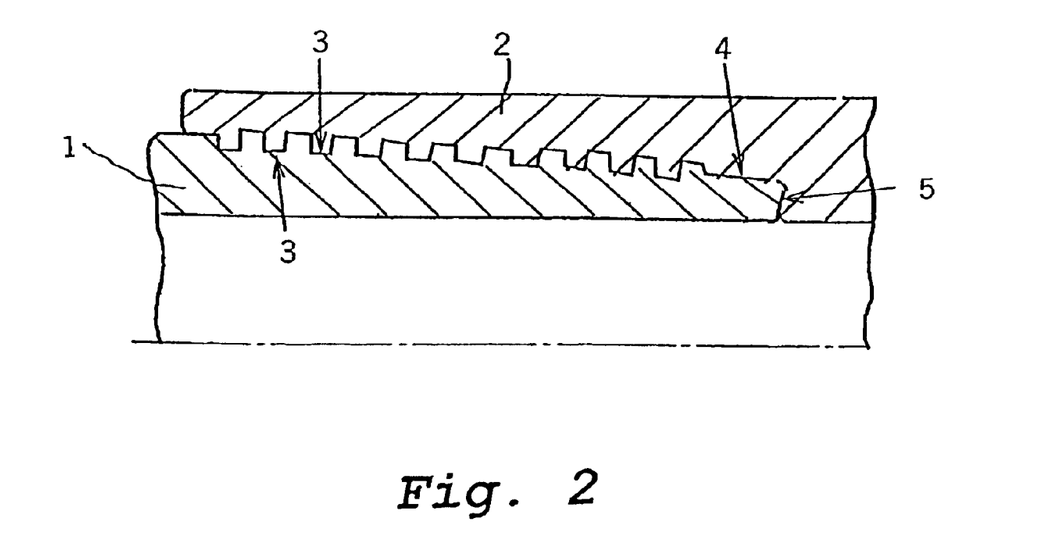
FIG. 2 is a diagram which schematically shows a connecting portion of a threaded joint for steel pipes according to the present invention.

FIG. 2 is a diagram which schematically shows the structure of a typical threaded joint for steel pipes. In the figure, 1 is a pin, 2 is a box, 3 is a threaded portion, 4 is an unthreaded metal contact portion, and 5 is a shoulder portion. In the following description, an unthreaded metal contact portion will also be referred to as simply a metal contact portion.

As shown in FIG. 2, a typical threaded joint is comprised of a pin 1 having a threaded portion 3 (more precisely, a male thread portion) and an unthreaded metal contact portion 4 formed on the outer surface at an end of a steel pipe, and a box 2 having a threaded portion 3 (more precisely, a female thread portion) and an unthreaded metal contact portion 4 formed on the inner surface of a threaded joint member (a coupling). However, the location of a pin and a box is not limited to the depicted one. For example, a coupling may be omitted by forming a pin at one end of a steel pipe and a box at the other end of the pipe, or a pin (a male thread) may be formed on a coupling with a box being formed at both ends of a steel pipe.

The threaded portion 3 and the (unthreaded) metal contact portion 4 on each of the pin and the box constitute a contact surface of the threaded joint. The contact surface and particularly the unthreaded metal contact portion which is more susceptible to galling is required to have galling resistance. For this purpose, in the prior art, a compound grease containing a heavy metal powder was applied to the contact surface, but the use of a compound grease involves many problems from the standpoints of the environment and working efficiency.

In accordance with the present invention, a coating fluid containing a binder resin and a lubricating powder in a solvent is applied to the contact surface of at least one of the pin and the box, and the applied coating is dried by heating to form a solid lubricant coating. The solid lubricant coating formed on the contact surface of a threaded joint is subjected to high pressure of sliding while the threaded joint is fastened and loosened repeatedly, thereby producing wear particles comprising the lubricating powder. It is presumed that these wear particles containing a lubricating powder are distributed over the entire contact surface to contribute to prevention of metal-to-metal contact at the contacting interface and alleviation of friction, thereby exhibiting an anti-galling effect.

It is desirable that the contact surface of at least one of the pin and the box to which a coating fluid is applied be previously roughened such that the surface has a roughness (Rmax) of 5–40 $\mu$m, which is greater than the surface roughness as machined (3–5 $\mu$m), in order to further improve the effect achieved by the present invention. If the value of Rmax of the surface to be coated is less than 5 $\mu$m, the resulting solid lubricant coating may have decreased adhesion. On the other hand, if it is greater than 40 $\mu$m, the coated surface may produce increased friction and promote abrasive wear of the solid lubricant coating, and the coating may not withstand repeated fastening and loosening of the joint. However, the effect of the present invention is of course obtainable even if the surface roughness is not in the above-described range.

The method of surface roughening may be a method of roughening the steel surface itself such as blasting with sand or grit and dipping in a strong acid solution such as sulfuric acid, hydrochloric acid, nitric acid, or hydrofluoric acid to roughen the surface. Another possible method is to form a primary (underlying) coat layer having a rougher surface than the steel surface to roughen the surface to be coated.

Examples of a method of forming such a primary coat layer include a method of forming a chemical conversion coating such as a phosphate, oxalate, or borate treatment (in which the surface roughness of the crystal layer increases as the crystals which are formed grow), a method of electroplating with a metal such as copper or iron (in which peaks or raised points are preferentially plated so that the surface is slightly roughened), an impact plating method in which particles having an iron core coated with zinc or a zinc-iron alloy are blasted using centrifugal force or pneumatic pressure to form a coating of zinc or a zinc-iron alloy, a soft nitriding method forming a nitride layer (e.g., tufftriding), a composite metallic coating method in which a porous coating comprising solid fine particles in a metal is formed, and the like.

From the viewpoint of adhesion of a solid lubricant coating, a porous coating, particularly a chemical conversion coating formed by phosphating (with manganese phosphate, zinc phosphate, iron-manganese phosphate, or zinc-calcium phosphate) or a coating of zinc or a zinc-iron alloy formed by impact plating is preferred. A more preferred coating is a manganese phosphate coating from the standpoint of adhesion or a zinc or a zinc-iron alloy coating from the standpoint of rust prevention. Both a phosphate coating formed by chemical conversion treatment and a zinc or zinc-iron alloy coating formed by impact plating are porous, so they can provide a solid lubricant coating formed thereon with an increased adhesion.

When a primary coat layer is formed, the thickness of the layer is not restricted, but it is preferably in the range of 5–40 $\mu$m from the standpoints of rust prevention and adhesion. With a thickness of less than 5 $\mu$m, sufficient rust prevention may not be achieved. A thickness of greater than 40 $\mu$m may cause a decrease in adhesion of a solid lubricant coating formed thereon.

The resin present in a solid lubricant coating may be any resin capable of functioning as a binder. A resin having thermal resistance and a reasonable level of hardness and wear resistance is suitable. Examples of such a resin include thermosetting resins such as epoxy resins, polyimide resins, polycarbodiimide resins, polyethersulfones, polyetheretherketone resins, phenolic resins, furan resins, urea resins, and acrylic resins, as well as thermoplastic resins such as polyamideimide resins, polyethylene resins, silicone resins, and polystyrene resins.

Although the lubricating powder may be any powder exhibiting lubricity, in view of the high load which is applied, it is desirable to use a powder of one or more substances selected from molybdenum disulfide, tungsten disulfide, graphite, boron nitride, and PTFE (polytetrafluoroethylene). Particularly preferred is a powder of molybdenum disulfide and/or tungsten disulfide, both providing a high relaxation of wear and friction, or a mixture thereof with other lubricating powder or powders.

Preferably, the lubricating powder has a mean particle diameter in the range of 0.5–60 $\mu$m. If it is less than 0.5 $\mu$m, the powder tends to aggregate, and uniform dispersion of the powder in a coating fluid may become difficult. As a result, there are cases in which a desired solid lubricant coating having a lubricating powder uniformly dispersed therein is not formed, resulting in insufficient galling resistance. On the other hand, if the mean particle diameter of the lubricating powder is larger than 60 μm, the strength of the solid lubricant coating may be decreased to such an extent that the occurrence of galling cannot be prevented.

The ratio of the lubricating powder to the resin binder is preferably such that the mass ratio of lubricating powder to binder is in the range of 0.3–9.0 from the standpoint of galling resistance. If the mass ratio of lubricating powder to binder is less than 0.3, the amount of the lubricating powder in the above-described wear particles may be insufficient, and galling resistance may become poor. On the other hand, if the mass ratio is greater than 9.0, the solid lubricant coating may have insufficient strength, so it cannot withstand a high pressure and has a decreased adhesion to the substrate surface, thereby causing the galling resistance and gas tightness to deteriorate. The mass ratio of the lubricating powder to the binder is preferably in the range of 0.5–9.0 in view of galling resistance and more preferably in the range of 1.0–8.5 further taking adhesion into consideration.

A solvent which is used to form a coating fluid may be a single solvent or a mixed solvent selected from various low-boiling solvents including hydrocarbons (e.g., toluene) and alcohols (e.g., isopropyl alcohol). Preferably, the solvent has a boiling temperature of 150° C. or below.

The coating fluid used to form a solid lubricant coating may contain an additional constituent or constituents, in addition to a solvent, a resin, and a lubricating powder. For example, one or more powders selected from zinc powder, a chrome pigment, and alumina may be added. In addition, a colorant may be present such that the resulting solid lubricant coating is colored. If appropriate, the coating fluid may contain one or more additives such as a dispersant, an antifoaming agent, and a thickening agent.

In an embodiment of the present invention, ultraviolet screening fine particles are added to the coating fluid to form a solid lubricant coating comprising a lubricating powder, a resin and ultraviolet screening fine particles. Thus, it is possible to significantly improve the rust preventing properties of a solid lubricant coating while maintaining its galling resistance and gas tightness, whereby the contact surface of a threaded joint is inhibited from rusting caused by aging of the solid lubricant coating formed thereon, and hence the occurrence of galling and a decrease in gas tightness due to rusting are also suppressed. As a result, even if a threaded joint having a solid lubricant coating formed thereon is stored outdoors for a prolonged period, it is prevented from suffering a significant deterioration in properties, and its reliability as a product is significantly improved.

An organic ultraviolet absorbing agent (e.g., benzotriazole or its derivative) is sometimes added to coating compositions in order to improve their weatherability. In the present invention, such an organic ultraviolet absorbing agent is not effective.

The ultraviolet screening fine particles which are used in the present invention are not limited as long as they are fine particles having a high absorbance and refractive index in the ultraviolet region (300–400 nm in wavelength). Examples of materials of such fine particles include titanium oxide, zinc oxide, iron oxide, barium sulfate, silica, composite particles of zirconia and a polyamide, and synthetic mica in which iron is included.

By reason of a less adverse effect on galling resistance, titanium oxide, zinc oxide, iron oxide, barium sulfate, and silica are preferred. More preferred are titanium oxide, zinc oxide, and iron oxide in view of uniform dispersibility of fine particles in a coating.

As the ultraviolet screening fine particles, it is preferable to use so-called ultra-fine particles having a mean particle diameter in the range of 0.01–0.1 μm from the standpoint of the balance between ultraviolet screening properties or aging with time of a solid lubricant coating and galling resistance thereof, although larger particles up to those having a mean particle diameter on the order of 2 μm may be used. If the ultraviolet screening fine particles have a mean particle diameter of less than 0.01 μm, they have a strong tendency toward aggregation and may be distributed unevenly in a solid lubricant coating, and the resistance to aging of the coating may be insufficient. Ultraviolet screening fine particles having a mean particle diameter of greater than 0.1 μm may inhibit the anti-galling properties of a lubricating powder, thereby deteriorating the galling resistance of a solid lubricant coating.

The content of the ultraviolet screening fine particles in a solid lubricant coating is preferably such that the mass ratio of the particles to 100 parts of the binder is in the range of 0.1–50 and more preferably 1–30. If the amount of the ultraviolet screening fine particles is less than 0.1 parts based on 100 parts of the resin, the ultraviolet screening effect may become insufficient, and the solid lubricant coating may not be inhibited from aging, thereby making it impossible to maintain rust preventing properties, gas tightness, and galling resistance during repeated fastening and loosening. Addition of ultraviolet screening fine particles in an amount of more than 50 parts based on 100 parts of the resin may have a substantial adverse effect on the strength, adhesion, and galling resistance of a solid lubricant coating.

The above-described coating fluid which comprises a binder resin, a lubricating powder, and optionally ultraviolet screening fine particles in a solvent is applied to the contact surface (threaded portion and unthreaded metal contact portion) of at least one of the pin and the box. The application may be performed in any suitable method known in the art including brush coating, dipping, and air spraying.

It is desirable that the application be performed so as to form a solid lubricant coating having a thickness of at least 5 μm and not greater than 50 μm. With a solid lubricant coating having a thickness of less than 5 μm, the amount of the lubricating powder present therein may be small, and the effectiveness of the coating in improving lubricity may be decreased. When the thickness of the solid lubricant coating is greater than 50 μm, there are cases in which the gas tightness is decreased due to insufficient tightening during fastening, or if the pressure is increased in order to guarantee the gas tightness, galling may occur easily, or the solid lubricant coating may peel off easily.

After application, the applied coating is preferably dried by heating to form a coating having an increased hardness. The heating temperature is preferably 120° C. or higher and more preferably from 150° C. to 380° C. The duration of heating may be determined based on the size of a threaded joint for steel pipes, and it is preferably at least 20 minutes and more preferably 30–60 minutes.

According to another embodiment of the present invention, this heating for drying an applied coating is performed by at least two stages. Thus, initially, first stage heating is carried out at a lower temperature to sufficiently evaporate the solvent and moisture from the inside of the coating while the coating remains fluid. Thereafter, second stage heating is conducted in a temperature range which is higher than that for the first stage heating to further evaporate the solvent and moisture, thereby making it possible to form a solid lubricant coating having a high hardness and a high wear resistance. The solid lubricant coating exhibits excellent galling resistance even in the environment of high-temperature oil wells. It also possesses excellent rust preventing properties.

Specifically, an applied coating is dried by multistage heating which includes at least first stage heating in the temperature range of from 70° C. to 150° C. and second stage heating in the range of from higher than 150° C. to 380° C. The heating period (duration of temperature retention) for each heating stage may be determined depending on the size of a threaded joint for steel pipes, and it is preferably at least 20 minutes and more preferably 30–60 minutes.

The first stage heating which is performed at a temperature of less than 70° C. is not sufficiently effective for evaporating the solvent and moisture from the inside of the applied coating. If it is performed at a temperature of higher than 150° C., the applied coating is solidified while the solvent and moisture still remain inside, resulting in insufficient hardening of the coating. Regarding the temperature for the second stage heating, if it is 150° C. or lower, it is difficult to completely remove the solvent and moisture from the coating, and if it is higher than 380° C., an adequate hardness cannot be obtained in view of the heat resistance of the solid lubricant coating itself. The temperature range for the first stage heating is preferably 80° C.–140° C. from the standpoint of ease of evaporation of the solvent and moisture, and that for the second stage heating is preferably 180° C. and 350° C. in view of coating hardness.

Figure 3A:
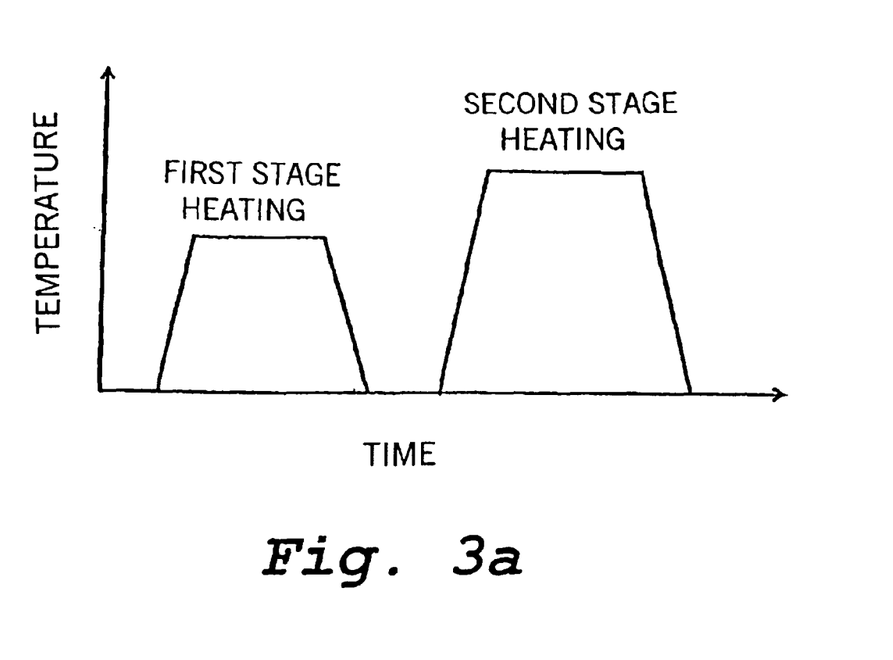
FIGS. 3a and 3b are diagrams showing examples of the heating pattern (temperature profile) of first stage heating and second stage heating in a process for the surface treatment of a threaded joint for steel pipes according to the present invention.
Figure 3B:
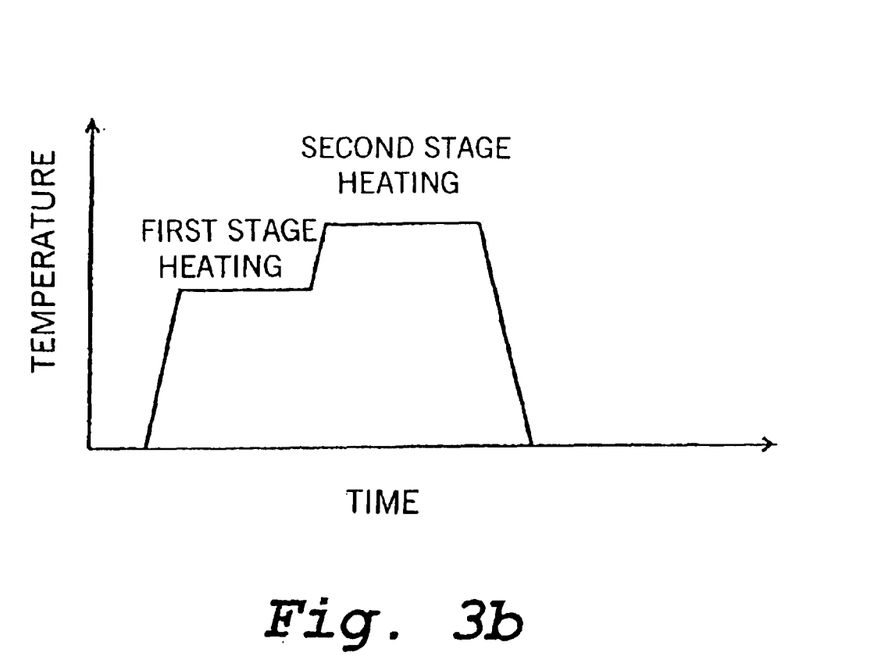

FIGS. 3a and 3b show examples of temperature profiles (heating patterns) of two stage heating consisting of first and second stage heating. As shown in FIG. 3a, the first stage heating may be followed by cooling before the second stage heating is started, or as shown in FIG. 3b, the first and the second stage heating may be carried out consecutively.

Furthermore, the first stage heating and/or the second stage heating itself may be conducted by multistage heating so that the entire heating is performed at temperatures of three or more stages. However, from the viewpoint of economy, two stage heating consisting of first and second stage heating is preferred.

In addition, both of the first and the second stage heating, and particularly the first stage heating need not be performed by maintaining a constant temperature as shown in the figures, but the heating may be performed while slowly raising the temperature. In the latter case, for the first stage heating, if the length of time required to raise the temperature from 70° C. to 150° C. is 20 minutes or longer, such heating is regarded as the first stage heating according to the present invention. In the prior art, when an applied coating is heated at a temperature of from 150° C. to 300° C., for example, the length of time required to raise the temperature from 70° C. to 150° C. is generally at most 5 minutes, and this is clearly different from the present invention.

Prior to the application of a coating fluid, it is desirable to heat (i.e., preheat) the contact surface to be coated (coating surface) at a temperature of from 50° C. to 200° C. for the purpose of increasing the adhesion of the resulting solid lubricant coating. Preheating at a temperature of lower than 50° C. provides little effect on improvement of adhesion. If the preheating temperature is higher than 200° C., the applied coating fluid (applied coating) has a decreased viscosity, thereby making it difficult to form a solid lubricant coating with a sufficient thickness, and in fact the adhesion of the coating is decreased. The duration of preheating may be determined in accordance with the size of the threaded joint for steel pipes, and it is preferable that the temperature of the coating surface be maintained in the above-mentioned range throughout the coating application. However, some effect on improvement of adhesion is attainable even if the temperature immediately before the onset of the coating application is in the above-described range without subsequent temperature retention during the coating application.

Both preheating and heating after coating application can be carried out by a known ordinary method such as furnace heating or hot air heating. In order to heat a box, it is efficient and economical to heat it in a heating furnace to maintain the surface at a predetermined temperature. A pin may be heated by inserting only the threaded end portion into a heating furnace or by heating with hot air to maintain the surface at a predetermined temperature. For the aforementioned multistage heating, since it is necessary to control the temperature within a certain range, heating is preferably by furnace heating. The atmosphere in the furnace is not limited and atmospheric air is sufficient.

When an applied coating is dried by the aforementioned multistage heating, a well-hardened solid lubricant coating can be formed. Preferably, the resulting solid lubricant coating has a value of hardness in the range of 70–140 expressed as a Rockwell M scale hardness prescribed by JIS-K7202 (hereunder simply referred to as a Rockwell M hardness). A coating having a Rockwell M hardness of less than 70 may cause a rapid increase in the amount of wear when subjected to sliding friction occurring during repeated fastening and loosening of the threaded joint, resulting in insufficient galling resistance. If this hardness of the coating is greater than 140, wear is too light to provide wear particles to the contact surface in an amount sufficient to prevent the surface from galling. In view of galling resistance, the Rockwell M hardness of the coating is more preferably in the range of 90–140.

A solid lubricant coating which contains molybdenum disulfide and/or tungsten disulfide as a lubricating powder and which has been dried by a conventional drying method of one-stage heating has a Rockwell M hardness on the order of 50. In accordance with the present invention, it is possible for a threaded joint for steel pipes having a solid lubricant coating containing molybdenum disulfide and/or tungsten disulfide as a lubricating powder to have a higher coating hardness which is in the range of 70–140 in Rockwell M hardness.

It is desired for a solid lubricant coating formed on a threaded joint for steel pipes to have excellent adhesion. This is because the coating is subjected to shear stress under a high load during fastening and loosening of the joint, and if the adhesion is low, the coating ends up peeling off and failing to exhibit a sufficient anti-galling effect.

There are various methods for evaluating the adhesion of a coating. A simple and well-known method is the so-called grid cut (adhesive tape peeling) test. However, this method cannot be employed to test a solid lubricant coating of a threaded joint, since the adhesion desired therefor is much higher than the level measurable by the grid-cut test.

The present inventors found that the adhesion (peeling resistance) of a solid lubricant coating formed on a threaded joint can be quantitatively assessed by the adhesive strength measured by the SAICAS (Surface And Interfacial Cutting Analysis System) method detailed in the Japanese-language journal, "Toso Gijutsu (Coating Technique)", April 1995, pp. 123–135 and that when this adhesive strength of a solid lubricant coating is at least a certain value, the coating is prevented from peeling off during fastening and loosening even if it has a high hardness.

According to the SAICAS method, a sharp cutting edge is forced against the surface of a coating under a load while the substrate to which the coating adheres is moved in a horizontal direction, thereby cutting the coating obliquely from the surface to the interface with the substrate. After the edge reaches the interface, the applied load is adjusted so that the cutting edge is allowed to move horizontally along the interface. The adhesive strength of the coating can be determined as the peel force per peel width (width of the cutting edge) (N/m) required to peel the coating while the edge is moved along the interface. A measuring device for the SAICAS method is sold on the market by Daipla-Wintes under the trade name SAICAS.

In a preferred embodiment of the present invention, a solid lubricant coating formed on the contact surface of a threaded joint as a substrate has an adhesive strength of at least 500 N/m as measured by the SAICAS method. If the adhesive strength of the coating to the substrate is less than 500 N/m, the coating may not exhibit a sufficient anti-galling effect.

A solid lubricant coating which has been dried by multi-stage heating according to the aforementioned embodiment of the present invention tends to exhibit improved adhesive strength compared with a similar coating which has been dried in a conventional manner. The adhesive force can be further improved by performing the above-described surface coarsening and/or preheating of the substrate, if necessary.

Although a solid lubricant coating may be applied to the contact surface of both the pin and the box, the objects of the present invention can be achieved by applying the coating to only one of these elements, and this is advantageous in terms of cost. In such cases, the solid lubricant coating is formed by a relatively easy operation if it is formed on the contact surface of a box, which is shorter. The other joint element (preferably a pin), to which the solid lubricant coating is not applied, may be uncoated. In particular, when the pin and the box are temporarily fastened to each other before shipment as shown in FIG. 1, the other joint element, e.g., the pin, can be prevented from rusting even if its contact surface is uncoated (e.g., even if it is as-machined), since the contact surface of the pin is brought into intimate contact with the coating formed on the contact surface of the box by the temporary fastening. The solid lubricant coating may be applied to only a part of the contact surface, particularly only to the metal contact portion.

However, when a box is connected to a pin of a steel pipe at one end of the pipe as shown in FIG. 1, the other pin of the steel pipe which is located at the opposite end of the pipe and the unconnected half of the box remain exposed to the atmosphere. These exposed contact surfaces of the pin and the box may be subjected to a suitable surface treatment to provide rust prevention with or without lubricity, and/or may be protected by attachment of a suitable protector. Such surface treatment may be applied to the contact surface of the aforementioned other joint element.

A threaded joint for steel pipes according to the present invention can be fastened without application of a compound grease, but an oil may be applied to the solid lubricant coating or the contact surface of the mating element to be connected, if desired. In the latter case, the oil which is applied is not restricted, and any of a mineral oil, a synthetic ester oil, and an animal or vegetable oil may be used. Various additives such as a rust-preventing agent and an extreme pressure agent which have conventionally been used for lubricating oils may be added to the oil. If such an additive is a liquid, it may be used alone as an oil to be applied.

Useful rust-preventing agents include basic metal sulfonates, basic metal phenates, basic metal carboxylates, and the like. As an extreme pressure agent, known agents such as sulfur-, phosphorus-, or chlorine-containing ones and organometal salts may be used. In addition, other additives such as an anti-oxidant, a pour point depressant, and a viscosity index improver may be added to the oil.

The present invention provides a threaded joint for steel pipes having a solid lubricant coating on the contact surface thereof, the coating exhibiting improved galling resistance, gas tightness, wear resistance, and rust preventing properties. As a result, the threaded joint can be inhibited from galling during repeated fastening and loosening without application of a compound grease. This effect is maintained when the joint is used to dig a crude oil well in a high-temperature environment such as a deep, high-temperature oil well or a steam-injection oil well, or it lasts when the threaded joint is left outdoors for a prolonged period before the use of the joint at a rig site.

EXAMPLES

The present invention will be described more fully by the following examples. These examples are purely for illustrative purposes and are not intended to restrict the present invention. In the following description, the contact surface of a pin is referred to as a pin surface, and the contact surface of a box is referred to as a box surface.

Examples 1–7 and Comparative Examples 1–4

The pin surface and the box surface of a threaded joint for steel pipes [outer diameter: 7 inches (178 mm), wall thickness: 0.408 inches (10.4 mm)] made of a material selected from a carbon steel A, a Cr—Mo steel B, a 13%-Cr steel C, and a high alloy steel D each having a composition shown in Table 1 (galling occurring most easily with D, and galling becoming successively more difficult with C, B, and A) were subjected to one of the combinations of surface treatment (surface pretreatment and optionally formation of a solid lubricant coating) shown in Table 2 as No. 1 to 5, as described below for each example. Table 2 shows the surface roughness in Rmax (R) of the pretreated surface and the thickness (t) of a primary coat layer (pretreatment coating), as well as the thickness of a lubricating coating (t) and the mass ratio of a lubricating powder to a resin (binder) (M). In these examples, pretreatment was applied to the contact surface of each of the pin and the box, but a solid lubricant coating was formed on one of the pin surface or the box surface. To the pin surface or the box surface on which a solid lubricant coating was not formed, a commercially available, ordinary rust-preventing oil which did not contain heavy metal powder was applied in order to prevent the surface from rusting. The fastening and loosening test was carried out without removing the rust-preventing oil.

The coating fluid which was used to form the solid lubricant coating was a dispersion in which a lubricating powder was dispersed in a solution of a resin dissolved in a solvent. The solvent which was used was a mixed solvent of ethanol/toluene (50/50) for a polyamideimide resin, N-methyl-2-pyrrolidone/xylene (65/35) for a phenolic resin, and tetrahydrofuran/cyclohexane (50/50) for an epoxy resin.

Preheating of the substrate prior to application of the coating fluid and heating for drying after the application were both carried out in atmospheric air using a heating furnace. Table 3 shows a number for the type of surface treatment (in Table 2), preheating temperature of the substrate (temperature of the substrate before the coating fluid was applied), and the heating conditions for drying the applied coating after the fluid was applied (temperature×duration of heating for first stage heating and second stage heating).

Separately, the same combinations of pretreatment and formation of a solid lubricant coating as shown in Table 2 were performed on a steel plate (10 mm×50 mm×2 mm thick) having the same composition as the steel pipe used as a substrate. Thus, the pretreatment which was performed was the same as performed on the contact surface of the element on which a solid lubricant coating was formed (i.e., box for No. 1 to 4 and pin for No. 5 in Table 2). The resulting solid lubricant coating was measured for adhesive strength and hardness. The adhesive strength of the coating was measured using a measuring device SAICAS BN-1 manufactured by Daipla-Wintes. The coating hardness was measured in terms of Rockwell M scale according to JIS-K7202. The results of these measurements are also shown in Table 3.

Using a threaded joint which had been subjected to surface treatment as described above, a test was carried out by repeating fastening and loosening operations up to 20 times in the manner shown in Table 4 while examining the occurrence of seizing or galling. Thus, as shown in Table 4, fastening and loosening were carried out at ambient temperature for the first to fourth, sixth to fourteenth, and sixteenth to twentieth runs of operation, and for the fifth and fifteenth runs, after fastening was carried out, the threaded joint was subjected to heating for 24 hours at 350° C. and then cooled before loosening was carried out at ambient temperature. The fastening and loosening conditions corresponded to the use conditions for a heat-resistant threaded joint. The fastening speed was 10 rpm and the fastening torque was 10340 ft·lbs. The results of the occurrence of seizing or galling are shown in Table 5.

TABLE 1

| Steel Type | (mass %) | | | | | | | | |
|---|---|---|---|---|---|---|---|---|---|
| | C | Si | Mn | P | S | Cu | Ni | Cr | Mo |
| A | 0.24 | 0.30 | 1.30 | 0.02 | 0.01 | 0.04 | 0.07 | 0.17 | 0.04 |
| B | 0.25 | 0.25 | 0.80 | 0.02 | 0.01 | 0.04 | 0.05 | 0.95 | 0.18 |
| C | 0.19 | 0.25 | 0.80 | 0.02 | 0.01 | 0.04 | 0.10 | 13.0 | 0.04 |
| D | 0.02 | 0.30 | 0.50 | 0.02 | 0.01 | 0.50 | 7.00 | 25.0 | 3.20 |

TABLE 2

| No. | Substrate | Pretreatment | Solid Lubricating Coating |
|---|---|---|---|
| 1 | Pin | Grinding (R = 3) | None |
| | Box | Sand blasting (R = 31) | PAI[1] resin + MoS$_2$ (M = 4.0, t = 30) |
| 2 | Pin | Grinding (R = 3) | None |
| | Box | 1. Grinding (R = 4) | Epoxy resin + MoS$_2$ + Graphite |
| | | 2. Mn phosphating (t = 15, R = 20) | (M = 4.0, t = 28) |
| 3 | Pin | Grinding (R = 3) | None |
| | Box | 1. Grinding (R = 4) | Phenolic resin + WS$_2$ |
| | | 2. Cu plating (t = 10, R = 11) | (M = 4.0, t = 32) |
| 4 | Pin | Grinding (R = 4) | None |
| | Box | 1. Grinding (R = 4) | PAI[1] resin + MoS$_2$ (M = 4.0, t = 20) |
| | | 2. Zn—Fe alloy coat (t = 7, R = 18) | |
| 5 | Pin | 1. Grinding (R = 4) | PAI[1] resin + MoS$_2$ (M = 4.0, t = 28) |
| | | 2. Zn phosphating (t = 15, R = 20) | |
| | Box | 1. Grinding (R = 4) | None |
| | | 2. Mn phosphating (t = 10, R = 10) | |

(Notes)
[1]PAI resin = Polyamideimide resin;
"R" indicates a surface roughness, Rmax (μm)
"t" indicates the thickness of a coating (μm); and
"M" indicates the mass ratio of lubricating powder to binder.

TABLE 3

| No. | Steel Type | Surface Treatment Number in Table 2 | Preheated Surface Temp. (° C.) | Heating Conditions Temp. × Duration (° C. × minutes) | Coating Rockwell M Scale Hardness | SAICAS Adhesive Strength (N/m)[1] |
|---|---|---|---|---|---|---|
| Example | | | | | | |
| 1 | A | No. 1 | 60 | 1st: 100 × 30<br>2nd: 260 × 30 | 125 | 9820 |
| 2 | A | No. 1 | 100 | 1st: 100 × 30<br>2nd: 260 × 30 | 110 | 12010 |
| 3 | B | No. 2 | 130 | 1st: 100 × 30<br>2nd: 230 × 30 | 125 | 10520 |
| 4 | B | No. 2 | 130 | 1st: 70 × 30<br>2nd: 230 × 30 | 100 | 6840 |

TABLE 3-continued

| No. | Steel Type | Surface Treatment Number in Table 2 | Preheated Surface Temp. (° C.) | Heating Conditions Temp. × Duration (° C. × minutes) | Coating Rockwell M Scale Hardness | SAICAS Adhesive Strength (N/m)[1] |
|---|---|---|---|---|---|---|
| 5 | C | No. 3 | 180 | 1st: 80 × 20<br>2nd: 170 × 60 | 95 | 2570 |
| 6 | D | No. 4 | 100 | 1st: 80 × 30<br>2nd: 170 × 40 | 80 | 11470 |
| 7 | A | No. 5 | 100 | 1st: 140 × 20<br>2nd: 280 × 30 | 130 | 12470 |
| Comparative | | | | | | |
| 1 | A | No. 2 | 175 | 150 × 50 | 60 | 460 |
| 2 | A | No. 1 | 180 | 240 × 50 | 50~125 | 240~10500 |
| 3 | A | No. 2 | 130 | 1st: 50 × 30<br>2nd: 230 × 30 | 65~100 | 320~6900 |
| 4 | A | No. 1 | None | 1st: 100 × 20<br>2nd: 410 × 30 | 60 | 350 |

[1]The adhesive strength in Comparative Examples 2 and 3 fluctuated greatly.

TABLE 4

| | |
|---|---|
| 1st to 4th times | fastening and loosening at ambient temperature |
| 5th time | after fastening at ambient temperature, heating for 24 hours at 350° C., then cooling to ambient temperature, and loosening |
| 6th to 14th times | fastening and loosening at ambient temperature |
| 15th time | after fastening at ambient temperature, heating for 24 hours at 350° C., then cooling to ambient temperature, and loosening |
| 16th to 20th times | fastening and loosening at ambient temperature |

TABLE 5

| Example No.[3] | Occurrence of seizing or galling[1] in the fastening run numbered below | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| Ex. 1 | ○ | ○ | ○ | ○ | ○ | ○ | ○ | ○ | ○ | ○ | ○ | ○ | ○ | ○ | ○ | ○ | ○ | ○ | ○ | ○ |
| Ex. 2 | ○ | ○ | ○ | ○ | ○ | ○ | ○ | ○ | ○ | ○ | ○ | ○ | ○ | ○ | ○ | ○ | ○ | ○ | ○ | ○ |
| Ex. 3 | ○ | ○ | ○ | ○ | ○ | ○ | ○ | ○ | ○ | ○ | ○ | ○ | ○ | ○ | ○ | ○ | ○ | ○ | ○ | ○ |
| Ex. 4 | ○ | ○ | ○ | ○ | ○ | ○ | ○ | ○ | ○ | ○ | ○ | ○ | ○ | ○ | ○ | ○ | Δ | Δ | Δ | Δ |
| Ex. 5 | ○ | ○ | ○ | ○ | ○ | ○ | ○ | ○ | ○ | ○ | ○ | ○ | ○ | ○ | Δ | Δ | Δ | Δ | Δ | Δ |
| Ex. 6 | ○ | ○ | ○ | ○ | ○ | ○ | ○ | ○ | ○ | ○ | ○ | ○ | ○ | ○ | Δ | Δ | Δ | Δ | Δ | Δ |
| Ex. 7 | ○ | ○ | ○ | ○ | ○ | ○ | ○ | ○ | ○ | ○ | ○ | ○ | ○ | ○ | ○ | ○ | ○ | ○ | ○ | ○ |
| Com Ex. 1 | Δ | x | — | — | — | — | — | — | — | — | — | — | — | — | — | — | — | — | — | — |
| Com Ex. 2 | ○ | ○ | ○ | ○ | Δ | x | — | — | — | — | — | — | — | — | — | — | — | — | — | — |
| Com Ex. 3 | ○ | ○ | ○ | ○ | ○ | ○ | Δ | Δ | x | — | — | — | — | — | — | — | — | — | — | — |
| Com Ex. 4 | Δ | x | — | — | — | — | — | — | — | — | — | — | — | — | — | — | — | — | — | — |

(Notes)
[1]○: No seizure;
Δ: Slight seizure (repairable);
x: Galling (unrepairable);
—: Not performed.

Example 1

A threaded joint made of a carbon steel of type A shown in Table 1 was subjected to the following surface treatment.

The box surface was pretreated by blasting with #60 sand so as to have a surface roughness of 31 μm. Thereafter, the box was preheated to 60° C., and a solid lubricant coating of a polyamideimide resin containing a lubricating powder of molybdenum disulfide and having a thickness of 30 μm was formed on the contact surface. The solid lubricant coating contained molybdenum disulfide with a mass ratio of molybdenum disulfide to polyamideimide resin of 4:1. Drying of the applied coating was performed by first stage heating for 30 minutes at 100° C. and, after cooling to ambient temperature, by second stage heating for 30 minutes at 260° C.

The pin surface was treated only by machine grinding (surface roughness: 3 μm).

In the following examples, the data shown in Table 2 are not indicated.

Example 2

The procedure of Example 1 was repeated except that the temperature at which the box was preheated prior to coating was changed from 60° C. to 100° C. and the conditions for heating after the application were changed in such a manner that the first stage heating for 30 minutes at 100° C. was directly followed by the second stage heating for 30 minutes at 260° C. without cooling.

Example 3

A threaded joint made of a Cr—Mo steel of type B shown in Table 1 was subjected to the following surface treatment.

The box surface was pretreated, after machine grinding, by forming a manganese phosphate chemical conversion coating thereon. Thereafter, the box was preheated to 130° C., and a solid lubricant coating of an epoxy resin containing a lubricating powder of a mixture of molybdenum disulfide and graphite (mass ratio=9:1) was formed on the surface. Drying of the applied coating was performed by first stage heating for 30 minutes at 100° C. and, after cooling to ambient temperature, by second stage heating for 30 minutes at 230° C.

The pin surface was treated only by machine grinding.

Example 4

The procedure of Example 3 was repeated except that the temperature for first stage heating after the coating application was changed from 100° C. in Example 3 to 70° C.

Example 5

A threaded joint made of a 13%-Cr steel of type C shown in Table 1 was subjected to the following surface treatment.

The box surface was pretreated, after machine grinding, by electroplating to form a copper coating. Thereafter, the box was preheated to 180° C., and a solid lubricant coating of a phenolic resin containing a lubricating powder of tungsten disulfide was formed on the box surface. Drying of the applied coating was performed by first stage heating for 20 minutes at 80° C. and, after cooling to ambient temperature, by second stage heating for 60 minutes at 170° C.

The pin surface was treated only by machine grinding.

Example 6

A threaded joint made of a high alloy steel of type D shown in Table 1 was subjected to the following surface treatment.

The box surface was pretreated, after machine grinding, by blast plating to form a zinc-iron alloy coating. Thereafter, the box was preheated to 100° C., and a solid lubricant coating of a polyamideimide resin containing a lubricating powder of molybdenum disulfide was formed on the box surface. Drying of the applied coating was performed by first stage heating for 30 minutes at 80° C. and, after cooling to ambient temperature, by second stage heating for 40 minutes at 170° C.

The pin surface was treated only by machine grinding.

Example 7

A threaded joint made of a carbon steel of type A shown in Table 1 was subjected to the following surface treatment.

The box surface was subjected to only pretreatment which was performed by machine grinding and then by forming a manganese phosphate chemical conversion coating thereon.

The pin surface was pretreated, after machine grinding, by forming a zinc phosphate chemical conversion coating thereon. Thereafter, only the pin portion was placed in a heating furnace to preheat it to 100° C., and a solid lubricant coating of a polyamideimide resin containing a lubricating powder of molybdenum disulfide was formed on the pin surface. Drying of the applied coating was performed by first stage heating for 20 minutes at 140° C. and, after cooling to ambient temperature, by second stage heating for 30 minutes at 280° C. while only the pin portion was placed in a heating furnace during heating.

As can be seen from Table 3, the solid lubricant coating formed in each of Examples 1 to 7 was hardened and had a Rockwell M hardness of at least 80. It also had a satisfactory adhesive strength of at least 2500 N/m as measured by the SAICAS method. Comparison between Examples 1 and 2 shows that a higher preheating temperature in Example 2 resulted in a slightly decreased coating hardness but an improved adhesive strength. Comparison between Examples 3 and 4 shows that a higher temperature for the first stage heating in Example 3 resulted in a higher value in both coating hardness and adhesive strength due to more complete drying of the coating.

Table 5 shows that in some of the threaded joints of Examples 1–7, slight seizing occurred in the 15th and later runs of a repeated fastening and loosening test which simulated a high-temperature oil well, but even in such cases, fastening and loosening could be repeated 20 times by surface dressing in all the examples with no problems with respect to gas tightness. The occurrence of slight seizing in Examples 5 and 6 was due to the steel material of the threaded joint, which is susceptible to seizing and galling. If the same solid lubricant coating as in Example 5 or 6 were formed on a threaded joint of steel type A or B, it is presumed that no seizing would occur. In Example 4, since the temperature for first stage heating was lower as set forth above, the resulting coating had a slightly low hardness, and therefore slight seizing occurred in the 17th and later runs.

Comparative Example 1

A threaded joint made of a carbon steel of type A shown in Table 1 was subjected to the following surface treatment.

The box surface was pretreated, after machine grinding, by forming a manganese phosphate chemical conversion coating thereon. Thereafter, the box was preheated to 175° C., and a solid lubricant coating of an epoxy resin containing a lubricating powder of a mixture of molybdenum disulfide and graphite (mass ratio=9:1) was formed on the box surface. Drying of the applied coating was performed by one stage heating for 50 minutes at 150° C.

The pin surface was treated only by machine grinding.

As shown in Table 5, in the fastening and loosening test, slight seizing occurred in the first run. Fastening and loosening for the second run proceeded after surface dressing, but galling (severe seizing) occurred to such an extent that loosening became impossible, so the test was terminated.

This example corresponds to a case in which only the first stage heating in the present invention was performed for drying. In this case, although the solvent and moisture evaporated to some extent from the inside of the coating, evaporation was not complete since second stage heating was not performed, and the resulting coating had a low hardness. In addition, although preheating was performed, the adhesive strength was also insufficient. Thus, the insufficient hardness and adhesive strength of the solid lubricant coating seemed to be responsible for the premature occurrence of galling.

Comparative Example 2

The procedure of Example 1 was repeated except that the preheating temperature was raised to 180° C. and the coating application was followed by heating which was performed by one stage heating for 50 minutes at 240° C.

As shown in Table 5, in the fastening and loosening test, slight seizing occurred in the fifth run. Fastening and loosening for the sixth run proceeded after surface dressing, but galling occurred in the sixth run, so the test was terminated.

This example illustrates a conventional heating method and corresponds to a case in which only the second stage heating in the present invention was performed. In this case, since first stage heating at a lower temperature was not performed, the wet coating solidified rapidly, and the solvent and moisture were confined within the coating, thereby causing a great fluctuation in the hardness and adhesive strength of the resulting solid lubricant coating. As a result, it is thought that galling occurred readily.

Comparative Example 3

The procedure of Comparative Example 1 was repeated except that the preheating temperature was lowered to 130° C. and the coating application was followed by heating which was performed by first stage heating for 30 minutes at 50° C. and, after cooling to ambient temperature, by second stage heating for 30 minutes at 230° C.

As shown in Table 5, in the fastening and loosening test, slight seizing occurred in the seventh run. Fastening and loosening for the sixth run proceeded after surface dressing, but galling occurred in the ninth run, so the test was terminated. Since the temperature for the first stage heating was too low, it is presumed that evaporation of the solvent and moisture from the inside of the coating which was solidifying became insufficient, and as in the case of Comparative Example 2 which corresponds to a conventional heating method, the hardness and adhesive strength of the resulting solid lubricant coating fluctuated locally, thereby causing galling.

Comparative Example 4

The procedure of Example 1 was repeated except that the pretreated box was not preheated and the coating application was followed by heating which was performed by first stage heating for 20 minutes at 100° C. and, after cooling to ambient temperature, by second stage heating for 30 minutes at 410° C.

As shown in Table 5, in the fastening and loosening test, slight seizing occurred in the first run. Fastening and loosening for the second run proceeded after surface dressing, but galling occurred to such an extent that loosening became impossible, so the test was terminated.

This result seemed to be due to the temperature for the second stage heating, which was too high, whereby evaporation of the solvent and moisture from the inside of the solid lubricant coating became insufficient and the solid lubricant coating itself became soft and peeled off quickly during fastening in the first run.

Examples 8–15 and Comparative Examples 5–6

The pin surface and the box surface of a threaded joint for steel pipes [outer diameter: 7 inches (178 mm), wall thickness: 0.408 inches (10.4 mm)] made of a material selected from a carbon steel A, a Cr—Mo steel B, a 13%-Cr steel C, and a high alloy steel D each having a composition shown in Table 1 were subjected to one of the combinations of surface treatment (surface pretreatment and formation of a solid lubricant coating) shown in Table 6. The details of the surface treatment will be described below for each example.

As described later, in these examples and comparative examples, a solid lubricant coating was formed only on the box surface, while the pin surface was either in an as-machined state or thereafter coated only with a primary coat layer. A commercially available, ordinary rust-preventing oil which did not contain heavy metal powder was applied to the pin surface in order to prevent the surface from rusting. It should be understood by those skilled in the art that if the solid lubricant coating were formed only on the pin surface, the same results would be obtained.

Table 6 shows the data on the pretreatment, i.e., the surface roughness in Rmax (R) of the substrate steel and the thickness of a primary coat layer (t), for each of the pin and the box, as well as the constitution of a solid lubricant coating, i.e., the particular resin (binder), lubricating powder, and ultraviolet screening fine particles which were used, the mass ratio of lubricating powder to resin (M) and the mass ratio (mass parts) of ultraviolet screening fine particles to 100 parts of resin (U) in the solid lubricant coating, the mean particle diameter of the ultraviolet screening fine particles (P), and the thickness of the solid lubricant coating (t).

The lubricating powder which was used had the following mean particle diameter:

| | |
|---|---|
| Molybdenum disulfide powder ($MoS_2$): | 15 μm |
| Tungsten disulfide powder ($WS_2$): | 4 μm |
| Graphite powder: | 1 μm |
| Boron nitride powder (BN): | 2 μm |
| PTFE powder: | 0.8 μm. |

Using a threaded joint which was treated as described above in which a solid lubricant coating was formed on the pretreated box surface and an oil was applied to the pretreated pin surface, the pin and the box were connected without applying a tightening force (torque), and the joint was subjected to an outdoor exposure test (average temperature: 28–33° C. and average relative humidity: 60–70%) for 3 months while the pin and the box were connected as above. After 3 months, the pin and the box were unfastened, and the box was examined for cracking of the solid lubricant coating formed on the box surface and for rusting of the box surface.

Furthermore, using the threaded joint which had been subjected to the outdoor exposure test, fastening and loosening were repeated up to 20 times at ambient temperature, without removing the oil applied to the pin surface, to examine for the occurrence of seizing or galling. This test was carried out with a fastening speed of 10 rpm and a fastening torque of 10340 ft-lbs. Table 7 show the results of occurrence of seizing or galling (in the sixth and later runs) and of cracking of the coating and rusting of the contact surface.

TABLE 6

| | | | | | Box | |
|---|---|---|---|---|---|---|
| | | | Pin | | | Solid Lubricating |
| TYPE | No. | ST[1] | Pretreatment | Coating | Pretreatment | Coating |
| EXAMPLES | 8 | A | Grinding, R = 2 | Oil[3] | Sand blasting, R = 15 | PAI resin[3], t = 28<br>$MoS_2$ (M = 3.8)<br>$TiO_2$ (U = 10.2, P = 0.03) |
| | 9 | A | 1. Grinding, R = 3 | Oil[3] | 1. Grinding, R = 3 | PAI resin, t = 27 |

TABLE 6-continued

| TYPE | No. | ST[1] | Pin Pretreatment | Coating | Box Pretreatment | Solid Lubricating Coating |
|---|---|---|---|---|---|---|
| | | | 2. Zn phosphating, t = 15 | | 2. Mn phosphating, t = 22 | $MoS_2$ (M = 3.8) ZnO (U = 10.2, P = 0.02) |
| | 10 | B | Grinding, R = 2 | Oil[3] | 1. Grinding, R = 3 2. Mn phosphating, t = 24 | Epoxy resin, t = 22 $WS_2$ (M = 1.0) $Fe_3O_4$ (U = 5.1, P = 0.05) |
| | 11 | C | Grinding, R = 2 | Oil[3] | 1. Grinding, R = 3 2. Cu plating, t = 6 | Phenolic resin, t = 28 $MoS_2$ + graphite (M = 4.0) $TiO_2$ (U = 25.4, P = 0.01) |
| | 12 | D | 1. Grinding, R = 3 2. Zn—Fe alloy coating, t = 6 | Oil[3] | 1. Grinding, R = 3 2. Zn—Fe alloy coating, t = 7 | PAI resin, t = 28 BN (M = 4.5) ZnO (U = 47.5, P = 0.005) |
| | 13 | A | 1. Grinding, R = 3 2. Zn phosphating, t = 15 | Oil[3] | Grinding, R = 3 | PAI resin, t = 25 $MoS_2$ + PTFE (M = 1.0) $TiO_2$ (U = 60.9, P = 0.03) |
| | 14 | A | 1. Grinding, R = 3 2. Zn phosphating, t = 15 | Oil[3] | 1. Grinding, R = 3 2. Mn phosphating, t = 21 | PAI resin, t = 28 $MoS_2$ (M = 3.8) $TiO_2$ (P = 0.03) + ZnO (P = 0.015) (U = 0.08) |
| | 15 | A | 1. Grinding, R = 3 2. Zn phosphating, t = 15 | Oil[3] | 1. Grinding, R = 3 2. Mn phosphating, t = 19 | PAI resin, t = 28 $MoS_2$ (M = 3.8) $BaSO_4$ (U = 10.2, P = 1.00) |
| [2]COMP | 5 | A | Grinding, R = 3 | Oil[3] | 1. Grinding, R = 3 2. Mn phosphating, t = 18 | PAI resin, t = 30 $MoS_2$ (M = 4.0) |
| | 6 | A | Grinding, R = 3 | Oil[3] | 1. Grinding, R = 3 2. Mn phosphating, t = 18 | PAI resin, t = 28 $TiO_2$ (U = 1.0, P = 0.03) |

(Notes)
[1]ST: Steel Type;
[2]COMP = Comparative Examples:
[3]Oil: Commercially available rust preventing oil;
[4]PAI resin = Polyamideimide resin;
"R" indicates a surface roughness, Rmax ($\mu$m);
"t" indicates the thickness of a coating ($\mu$m);
"M" indicates the mass ratio of lubricating powder to binder;
"U" indicates the mass ratio of UV screening fine particles relative to 100 parts of resin; and
"P" indicates the mean average particle diameter of UV screening fine particles.

TABLE 7

| Example No.[3] | Occurrence of seizing/galling[1] in the run numbered below ||||||||||||||| Occurrence[2] ||
|---|---|---|---|---|---|---|---|---|---|---|---|---|---|---|---|---|
| | 6 | 7 | 8 | 9 | 10 | 11 | 12 | 13 | 14 | 15 | 16 | 17 | 18 | 19 | 20 | Cracks | Rust |
| Ex. 8 | ○ | ○ | ○ | ○ | ○ | ○ | ○ | ○ | ○ | ○ | ○ | ○ | ○ | ○ | ○ | ○ | ○ |
| Ex. 9 | ○ | ○ | ○ | ○ | ○ | ○ | ○ | ○ | ○ | ○ | ○ | ○ | ○ | ○ | ○ | ○ | ○ |
| Ex. 10 | ○ | ○ | ○ | ○ | ○ | ○ | ○ | ○ | ○ | ○ | ○ | ○ | ○ | ○ | ○ | ○ | ○ |
| Ex. 11 | ○ | ○ | ○ | ○ | ○ | ○ | ○ | ○ | ○ | ○ | ○ | ○ | ○ | ○ | ○ | ○ | ○ |
| Ex. 12 | ○ | ○ | ○ | ○ | ○ | ○ | ○ | ○ | ○ | ○ | ○ | ○ | ○ | ○ | ○ | ○ | ○ |
| Ex. 13 | ○ | ○ | ○ | ○ | ○ | ○ | ○ | ○ | ○ | ○ | ○ | ○ | Δ | Δ | Δ | ○ | ○ |
| Ex. 14 | ○ | ○ | ○ | ○ | ○ | ○ | ○ | ○ | ○ | ○ | ○ | ○ | Δ | Δ | Δ | Δ | ○ |
| Ex. 15 | ○ | ○ | ○ | ○ | ○ | ○ | ○ | ○ | ○ | ○ | Δ | Δ | Δ | x | — | Δ | ○ |
| Com Ex. 5 | ○ | Δ | Δ | x | — | — | — | — | — | — | — | — | — | — | — | x | x |
| Com Ex. 6 | x in the 1st run. | | | — | — | — | — | — | — | — | — | — | — | — | — | ○ | ○ |

[1]○: No seizing or galling;
Δ: Slight seizure (repairable);
x: Galling (unrepairable);
—: Not performed.
[2]Occurrence of cracks: ○: No cracks; Δ: Slight cracks; x: Remarkable cracks
Occurrence of rust: ○: No rust; Δ: Slight rust but unproblematic; x: Remarkable rust (problematic).
[3]Ex: Example;
Com Ex.: Comparative Example Example 8

A threaded joint made of a carbon steel having composition A was subjected to the following surface treatment. The box surface was pretreated by sand blasting with #80 sand to have a surface roughness of 15 $\mu$m. A solid lubricant coating of a polyamideimide resin containing a lubricating powder of molybdenum disulfide and ultraviolet screening fine particles of titanium oxide having a mean particle diameter of 0.03 $\mu$m was formed on the box surface. The solid lubricant coating had a thickness of 28 $\mu$m, and it contained the lubricating powder with a mass ratio of 3.8 relative to the resin and the ultraviolet screening fine particles with a mass ratio of 10.2 relative to 100 parts of the resin. The applied coating was dried by heating for 30 minutes at 260° C. to make the resulting coating hard.

The pin surface was in an as-machined state produced by grinding (surface roughness: 2 μm).

In the following examples, the data shown in Table 6 are not indicated.

Example 9

A threaded joint made of a carbon steel having composition A was subjected to the following surface treatment.

The box surface was pretreated, after machine grinding, by forming a manganese phosphate chemical conversion coating on that surface. A solid lubricant coating of a polyamideimide resin containing a lubricating powder of molybdenum disulfide and ultraviolet screening fine particles of zinc oxide was formed on the primary coat layer in the same manner as in Example 8.

The pin surface was pretreated, after machine grinding, by forming a zinc phosphate chemical conversion coating on that surface.

Example 10

A threaded joint made of a Cr—Mo steel having composition B was subjected to the following surface treatment.

The box surface was pretreated, after machine grinding, by forming a manganese phosphate chemical conversion coating on that surface. A solid lubricant coating of an epoxy resin containing a lubricating powder of tungsten disulfide and ultraviolet screening fine particles of iron oxide was formed on the primary coat layer in the same manner as in Example 8 except that the heating temperature was changed to 230° C.

The pin surface was in an as-machined state produced by grinding.

Example 11

A threaded joint made of a 13%-Cr steel having composition C was subjected to the following surface treatment.

The box surface was pretreated, after machine grinding, by electroplating to form a copper coating. A solid lubricant coating of a phenolic resin containing a lubricating powder of a mixture of molybdenum disulfide and graphite and ultraviolet screening fine particles of titanium oxide was formed on the primary coat layer in the same manner as in Example 8 except that the heating temperature was changed to 170° C.

The pin surface was in an as-machined state produced by grinding.

Example 12

A threaded joint made of a high alloy steel having composition D was subjected to the following surface treatment.

The box surface was pretreated, after machine grinding, by blast plating to form a zinc-iron alloy coating. A solid lubricant coating of a polyamideimide resin containing a lubricating powder of boron nitride and ultraviolet screening fine particles of zinc oxide was formed on the primary coat layer in the same manner as in Example 8.

The pin surface was pretreated, after machine grinding, by blast plating to form a zinc-iron alloy coating on that surface.

Example 13

A threaded joint made of a carbon steel having composition A was subjected to the following surface treatment.

After the box surface was pretreated by machine grinding, a solid lubricant coating of a polyamideimide resin containing a lubricating powder of a mixture of molybdenum disulfide and PTFE and ultraviolet screening fine particles of titanium oxide was formed on the surface in the same manner as in Example 8.

The pin surface was pretreated, after machine grinding, by forming a zinc phosphate chemical conversion coating on that surface.

Example 14

A threaded joint made of a carbon steel having composition A was subjected to the following surface treatment.

The box surface was pretreated, after machine grinding, by forming a manganese phosphate chemical conversion coating on that surface. A solid lubricant coating of a polyamideimide resin containing a lubricating powder of molybdenum disulfide and ultraviolet screening fine particles of a mixture of titanium oxide and zinc oxide was formed on the primary coat layer in the same manner as in Example 8.

The pin surface was pretreated, after machine grinding, by forming a zinc phosphate chemical conversion coating on that surface.

Example 15

A threaded joint made of a carbon steel having composition A was subjected to the following surface treatment.

The box surface was pretreated, after machine grinding, by forming a manganese phosphate chemical conversion coating on that surface. A solid lubricant coating of a polyamideimide resin containing a lubricating powder of molybdenum disulfide and ultraviolet screening fine particles of barium sulfate was formed on the primary coat layer in the same manner as in Example 8.

The pin surface was pretreated, after machine grinding, by forming a zinc phosphate chemical conversion coating on that surface.

As shown in Table 7, in the outdoor exposure test, slight cracks were observed on the solid lubricant coating formed on the box surface in Examples 14 and 15. However, in all of Examples 8 to 15 including those examples, no rust was found. Accordingly, it is concluded that the rust preventing properties of a solid lubricant coating can be guaranteed by addition of ultraviolet screening fine particles.

In the fastening and loosening test, there was no occurrence of galling in Examples 8 to 12 while fastening and loosening were repeated 20 times, and gas tightness was maintained throughout. In Examples 13 and 14 in which the amount of ultraviolet screening fine particles was larger or smaller, slight seizing occurred in the 18th and later runs, but fastening and loosening could be continued up to the 20th run by performing surface dressing. In Example 15, slight seizing occurred in the 16th run, and fastening and loosening could be continued up to the 18th run. However, in the 19th run, galling occurred, and the test was terminated. This result seems to be because barium sulfate, which has a relatively low ultraviolet screening effect, was used for the ultraviolet screening fine particles, and its mean particle diameter was relatively coarse (1 μm). However, the galling resistance in that example is still considered to be improved, when compared to the result in Comparative Example 5 described below.

Comparative Example 5

A threaded joint made of a carbon steel having composition A was subjected to the following surface treatment.

The box surface was pretreated, after machine grinding, by forming a manganese phosphate chemical conversion coating on that surface. A solid lubricant coating of a polyamideimide resin containing a lubricating powder of molybdenum disulfide with no ultraviolet screening fine particles was formed on the primary coat layer in the same manner as in Example 8.

The pin surface was in an as-machined state produced by grinding.

As shown in Table 7, in the outdoor exposure test, severe cracks were observed on the solid lubricant coating formed on the box surface. Since the cracks reached the substrate, the surface was rusted noticeably. In the fastening and loosening test, slight seizing occurred in the 7th and later runs. Fastening and loosening could be continued up to the 8th run by performing surface dressing, but galling occurred in the 9th run, so the test was terminated.

Comparative Example 6

A threaded joint made of a carbon steel having composition A was subjected to the following surface treatment.

The box surface was pretreated, after machine grinding, by forming a manganese phosphate chemical conversion coating on that surface. A solid lubricant coating of a polyamideimide resin containing ultraviolet screening fine particles of titanium oxide was formed on the primary coat layer in the same manner as in Example 8.

The pin surface was in an as-machined state produced by grinding.

As shown in Table 7, in the outdoor exposure test, no cracks were observed on the solid lubricant coating formed on the box surface. No rusting was noted, either. However, in the fastening and loosening test, galling occurred in the first run, and the test was terminated. The absence of a lubricating powder seems to be responsible for the insufficient galling resistance.

What is claimed is:

1. A threaded joint for steel pipes comprising a pin and a box each having a contact surface including a threaded portion and an unthreaded metal contact portion, characterized in that the contact surface of at least one of the pin and the box has a solid lubricant coating formed thereon which comprises a lubricating powder, ultraviolet screening fine particles, and a resin; and wherein the ultraviolet screening particles are fine particles of one or more substances selected from titanium oxide, barium sulfate, iron oxide, silica, composite particles of zirconia and a polyamide, and a synthetic mica in which iron is included.

2. The threaded joint as set forth in claim 1, wherein the lubricating powder is a powder of one or more substances selected from molybdenum disulfide, tungsten disulfide, graphite, boron nitride, and polytetrafluoroethylene.

3. The threaded joint as set forth in claim 1, wherein the ultraviolet screening particles have a mean particle diameter of 0.01–0.1 $\mu$m.

4. The threaded joint as set forth in claim 1, wherein the ultraviolet screening particles are present in the solid lubricant coating with a mass ratio of 0.1–50 parts to 100 parts of the resin.

5. The threaded joint as set forth in claim 1, wherein the contact surface having the solid lubricant coating has a surface roughness of 5–40 $\mu$m Rmax.

6. The threaded joint as set forth in claim 1, wherein a porous coating layer is disposed between the solid lubricant coating and the contact surface.

7. The threaded joint as set forth in claim 1, wherein the ultraviolet screening particles are iron oxide and titanium oxide.

* * * * *